United States Patent

Miyokawa et al.

[11] Patent Number: 6,053,640
[45] Date of Patent: Apr. 25, 2000

[54] COMPOSITE MODULE FOR OPTICAL FIBER AMPLIFIER

[75] Inventors: Jun Miyokawa, Ichihara; Taijiro Takase, Chiba, both of Japan

[73] Assignee: The Furukawa Electric Co., Ltd., Tokyo, Japan

[21] Appl. No.: 09/155,994
[22] PCT Filed: Feb. 9, 1998
[86] PCT No.: PCT/EP98/00530
 § 371 Date: Oct. 6, 1998
 § 102(e) Date: Oct. 6, 1998
[87] PCT Pub. No.: WO98/36478
 PCT Pub. Date: Aug. 20, 1998

[30] Foreign Application Priority Data

Dec. 2, 1997 [JP] Japan .................................. 9-028102

[51] Int. Cl.$^7$ ...................................................... G02B 6/36
[52] U.S. Cl. ........................................... 385/88; 385/921
[58] Field of Search ........................................ 385/88–94

[56] References Cited

U.S. PATENT DOCUMENTS 5,692,084 11/1997 Roff ............................................ 385/88
5,930,430 11/1997 Pan et al. ................................... 385/94

FOREIGN PATENT DOCUMENTS 4-369627 12/1992 Japan .
8-254723 10/1996 Japan .

OTHER PUBLICATIONS 1.48μm High–output LD Module (in Japanese) Anritsu Technical Bulletin, vol. 65 (19993) pp. 48–54.

Special Feature Semiconductor Laser Module (in Japanese) Research Developments, Oki electric Industry Co. Ltd. vo. 58, No. 3 (1991) pp. 33–36, No Month.

*Primary Examiner*—Phan T. H. Palmer
*Attorney, Agent, or Firm*—Lacasse & Associates; Randy W. Lacasse; Wesley L. Strickland

[57] ABSTRACT

The invention provides an integrated module for optical fiber amplifiers which is able to efficiently diffuse, by a Peltier element, heat generated by an LD element outside the module, have a WDM filter component and a substrate firmly fixed for a longer period of time and further reduce the beam axis misalignment between an LD element and the WDM filter component even in a case where deformation arises at the subtrate. The part of the substrate (1), at which the Peltier element (12) is fixed, is a high thermal conductivity portion constructed of Cu or Cu-W based alloy, and at least a part of the base (11) is made into a low thermal conductivity portion constructed of Fe-Ni-Co based alloy, Fe-Ni based alloy, Fe-Ni-Cr based alloy, Fe-Cr based alloy or stainless steel, wherein the WDM filter component (5) is fixed at the low thermal conductivity portion of the base (11) by laser beam welding.

4 Claims, 5 Drawing Sheets

COMPOSITE MODULE FOR OPTICAL FIBER AMPLIFIER

TECHNICAL FIELD

The present invention relates to an integrated module for optical fiber amplifiers.

BACKGROUND ART

Japanese laid-open patent publication No. 116118 of 1996, relates to an optical fiber amplifier and more particularly to an amplifying system where pumping light is sent from an LD element into an Er doped optical fiber via a signal light channel to produce an excited state in the abovementioned Er doped optical fiber. By inputting the signal light into the optical fiber amplifier and causing the light to pass through the Er doped optical fiber, the signal light is amplified and is outputted.

In order to generate pumping light sent into an Er doped optical fiber in an optical fiber amplifier, a laser diode (hereinafter merely called LD) element is used.

In recent years, on the basis of requests for shortening the work time in assembling optical fiber amplifiers and downsizing of mounting areas, several optical elements including an LD element are in advance integrated in one package to make an integrated module for an optical fiber amplifier, which would be incorporated in an optical fiber amplifier.

Figure 4:
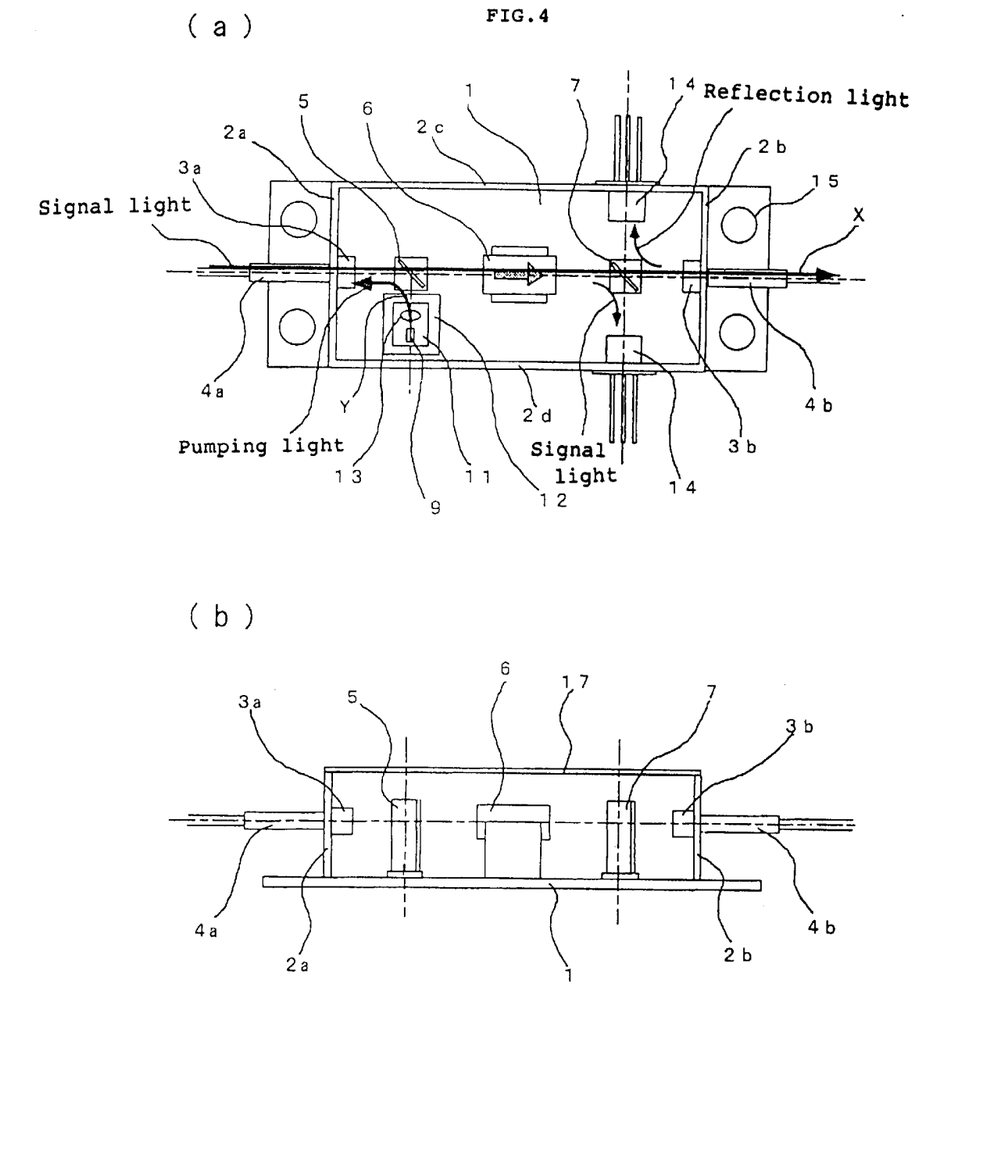
FIG. 4(a) is an upper plan view.
FIG. 4(b) is a side elevational view partially showing the cross section of the example.

As an example of an integrated module for a conventional optical fiber amplifier, a so-called backward pumping type, in which pumping light is sent into an Er doped optical fiber in reverse of the signal light advancing direction is shown in FIG. 4(a) and FIG. 4(b).

As shown in FIG. 4(a) and FIG. 4(b), in the integrated module for an optical fiber amplifier, the respective optical elements (WDM filter component 5, optical isolator 6, beam splitter component 7) are mounted in a package consisting of a substrate 1 and side plates 2a through 2d erected at four sides of the substrate 1.

Sealing glass components 3a and 3b are, respectively, secured at the side plates 2a and 2b, wherein the first optical fiber 4a (signal light inputting portion) which inputs signal light into the abovementioned module and sends pumping light from the module to an Er doped optical fiber (not illustrated) is fixed outside one sealing glass component 3a, and the second optical fiber 4b (signal light outputting portion) which outputs the abovementioned signal light from the corresponding module is fixed outside the other sealing glass component 3b.

These first and second optical fibers 4a, 4b are disposed so that the end faces thereof are confronting each other, and a signal light channel X through which signal light goes, is formed from the optical fiber 4a to the optical fiber 4b via above the substrate 1.

Furthermore, a lens (not illustrated) which collimates light is provided between the sealing glass component 3a and optical fiber 4a and between the sealing glass component 3b and optical fiber 4b.

WDM filter component 5, optical isolator 6 and beam splitter component 7 are disposed and fixed at the part which is made into the signal light channel X on the substrate 1, after their beam axes are aligned with each other.

Figure 5:
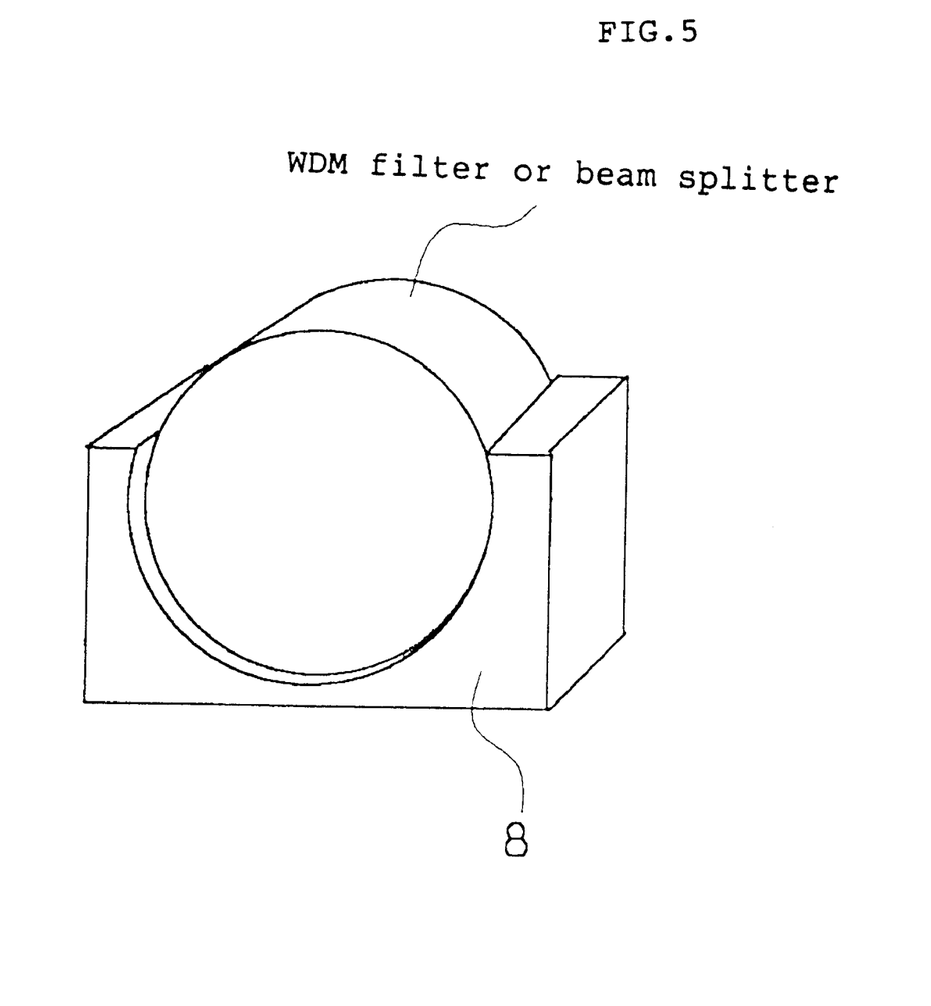
FIG. 5 is a perspective view showing one example in which a WDM filter and beam splitter are accommodated and fixed in a metallic holder.

For example, as shown in FIG. 5, the WDM filter component 5 and beam splitter component 7 are such that they are accommodated and fixed, by cementing with low melting point glass or welding by a YAG laser or soldering, at a metal holder 8 consisting of Fe-Ni-Co based alloy (hereinafter called KOVAR), 42Ni-Fe (42 alloy) or stainless steel, etc., and they are directly fixed on the substrate 1 below the underside of the metal holder 8 by laser beam welding such as YAG laser welding, etc.

An LD element 9 which generates pumping light is disposed at the side of the WDM filter component 5.

A heat sink which quickly absorbs heat generated at the LD element 9 is fixed on the underside of the LD element 9, and a base 11 consisting of, for example, Cu or Cu-W based alloy is fixed on the underside of the heat sink, and a Peltier element 12 is attached to the underside of the base 11. Furthermore, the underside of the Peltier element 12 is fixed on the substrate 1 by brazing such as soldering or Ag brazing, etc.

Furthermore, 13 is a collimator lens which collimates pumping light emitted from the LD element 9.

Photo diodes 14,14 (hereinafter merely called PD) are disposed at both sides of the beam splitter component 7. These PDs 14,14 are, respectively, attached to the side plates 2c, 2d.

Furthermore, the integrated module for optical fiber amplifier is sealed by a substrate 1, side plates 2a through 2d and upper face plate 17 in a state where nitrogen, etc., is internally enclosed, and is fixed at an optical fiber amplifier substrate by fixing with screws at, for example, an opening portion 15 of the substrate 1.

In such an integrated module for an optical fiber amplifier, signal light advances in the channel X in FIG. 4(a).

That is, signal light is inputted from the first optical fiber 4a into the module via the sealing glass component 3a and is made incident into the second optical fiber 4b end face via the sealing glass component 3b, passing from the first optical fiber 4a end face through the sealing glass component 3a, WDM filter component 5, optical isolator 6, and beam splitter component 7, wherein the signal light is outputted from the second optical fiber 4b to outside of the module.

Furthermore, a part of the signal light is reflected outside the signal light channel X by the beam splitter component 7 and is sampled by one side PD 14. Furthermore, in the beam splitter component 7, reflection light reversely advancing from the second optical fiber 4b into the signal light channel X is reflected in the reverse direction of the case of the signal light, and is sampled by the other PD 14.

Furthermore, the pumping light advances in a channel Y in FIG. 4(a).

That is, the pumping light is emitted from the LD element 9, reflected by the WDM filter component 5, made incident into the end face of the first optical fiber 4a, and is outputted from the first optical fiber 4a to outside the module.

Accordingly, the pumping light is provided into an Er doped optical fiber (not illustrated) and contributes to producing an excited state of the Er doped optical fiber.

Furthermore, the optical isolator 6 is an optical component to allow light to pass through in one direction and is able to interrupt the reflection light advancing from the second optical fiber 4b to the first optical fiber 4a side.

Herein, as a means for fixing optical components such as a WDM filter component 5, a beam splitter component 7, etc., on the substrate 1, laser beam welding by YAG welding, etc., which is able to firmly fix these components for a longer period of time, is used.

However, laser beam welding is a method by which heat is concentrated at the boundary of attached members to be welded and both members are instantaneously welded to each other. However, if the thermal conductivity of the members to be welded is high, heat is diffused via the members, wherein the welding itself is not carried out in a satisfactory condition.

Therefore, in an integrated module for a conventional optical fiber amplifier, in order to firmly fix the respective optical components such as a WDM filter component 5, etc., on the substrate 1 by laser beam welding, etc. for a longer period of time, a substrate made of KOVAR and stainless steel, which has a low thermal conductivity and is obtained at a low cost, were used as a substrate 1.

However, in such an integrated module for an optical fiber amplifier, it is required that the temperature of the LD element 9 is adjusted by the abovementioned Peltier element 12, in order to secure and maintain the laser characteristics of the LD element 9, and it is highly important that the output and reliability of the LD element 9 are further increased and improved in line with a demand for high output of signal light.

In order to meet such a demand, it is necessary to efficiently conduct heat, which is generated at the lower part of the Peltier element 12 when adjusting the temperature of the Peltier element 12, to the substrate 1 and to diffuse heat from the substrate 1 to outside the module.

However, conventionally, the thermal conductivity of materials such as KOVAR, stainless steel, etc., which are used for a substrate 1 is, for example, 30 W/mK or less, and is considerably low. Therefore, in the abovementioned module, it is difficult to efficiently diffuse heat, which is generated at the lower part of the Peltier element 12 when adjusting the temperature of Peltier element 12, outside the module.

Accordingly, in order to solve these problems, it is considered that the material of a substrate 1, which is adhered to and fixed at the lower part of Peltier element 12 by soldering, ,etc., is changed to a material, for example, CU and Cu-W based alloy, which has a better thermal conductivity than that of the abovementioned KOVAR usually used, thereby causing the thermal diffusion performance to outside the module to be improved.

Actually however, the problem which arises at this point is laser beam welding which is used to fix optical components such as the abovementioned WDM filter component 5, etc., to the substrate 1.

That is, since the thermal conductivity of CU or Cu-W based alloy is too high if a substrate 1 made of Cu or Cu-W based alloy is welded to a metallic holder 8 part of an optical component by laser beam welding, the heat due to the laser beam welding was quickly diffused, and the welding property was not of a satisfactory quality.

Therefore, it was difficult to firmly fix the substrate 1 and optical component such as a WDM filter component 5, etc., for a longer period of time.

Furthermore, when fixing the integrated module for optical fiber amplifiers to a substrate for optical fiber amplifiers, there are cases where deformation such as warping of the substrate 1 arises at the integrated module for optical fiber amplifiers.

At this time, the beam axes of the LD element 9 and the WDM filter component 5, the axes of which have been aligned when producing a module, deviated from each other to cause the optical coupling ratio to be lowered. That is, such a problem arises, by which the light quantity of the pumping light emitted from the first optical fiber 4*a* to outside the module is greatly decreased.

The present invention was developed in order to solve the abovementioned problems and other shortcomings, and it is therefore an object of the invention to provide an integrated module for optical fiber amplifiers, which is able to efficiently emit heat by a Peltier element outside the module, has a WDM filter component and a substrate firmly fixed for a longer period of time, and is able to minimize the beam axis deviation between an LD element and a WDM filter component even though deformation arises at the substrate.

DISCLOSURE OF THE INVENTION

An integrated module for optical fiber amplifiers according to the invention described in claim 1, has a signal light input portion, a signal light output portion and a substrate; in which;

a signal light channel is formed, through which signal light is caused to advance from the signal light input portion to the signal light output portion via the substrate;

a WDM filter component which allows signal light to pass through and reflects pumping light is disposed and fixed at a part which is a signal light channel on the abovementioned substrate;

a laser diode element which guides pumping light to the WDM filter component is disposed and fixed via a base and a Peltier element at parts other than the signal light channel on the substrate by brazing or soldering; and the pumping light emitted from the laser diode element is reflected by the WDM filter component and is outputted from the signal light input portion or the signal light output portion;

wherein a part, at which the Peltier element is fixed, of the abovementioned substrate is a high thermal conductivity portion constructed of Cu or Cu-W based alloy; and at least a part of the abovementioned base is a low thermal conductivity portion constructed of Fe-Ni-Co based alloy, Fe-Ni based alloy, Fe-Ni-Cr based alloy, Fe-Cr based alloy or stainless steel, and the abovementioned WDM filter component is fixed to the low thermal conductivity portion of the base, at which the abovementioned laser beam element is secured, by laser beam welding.

An integrated module for optical fiber amplifiers according to the invention described in claim 2, is of such construction as described in claim 1, wherein a beam splitter component which reflects a part of signal light or reflection light outside the signal light channel, causes the reflected light to be received by a photo diode, and allows the remaining light to pass through, is disposed at a part being a signal light channel on the substrate; and the abovementioned beam splitter component is fixed at the abovementioned low thermal conductivity portion of the rest, at which a low thermal conductivity portion is provided, by laser beam welding, and is fixed on the substrate via the abovementioned rest by brazing or soldering.

An integrated module for optical fiber amplifiers according to the invention described in claim 3 is of such construction as described in claim 1 or 2, wherein the base has a low thermal conductivity portion and a high thermal conductivity portion, the laser diode element is fixed at the abovementioned thermal conductivity portion of the base, a WDM filter component or beam splitter component is fixed at the abovementioned high thermal conductivity portion of the base.

In the invention, the high thermal conductivity portion means a part made of Cu or Cu-W based alloy, and the low thermal conductivity portion means a part made of Fe-Ni-Co based alloy, Fe-Ni based alloy, Fe-Ni-Cr based alloy, Fe-Cr based alloy or stainless steel.

In the integrated module for optical fiber amplifiers according to the invention described in claim 1, the part, at which at least a Peltier element is positioned, of the substrate is made into a high thermal conductivity portion.

Therefore, in comparison with a case where using a substrate made of low thermal conductivity materials such as KOVAR or stainless steel, it is possible to efficiently diffuse heat generated at the lower part of the Peltier element outside the module.

Furthermore, the WDM filter component is fixed at the low thermal conductivity portion of the abovementioned base by laser beam welding. And the abovementioned base and Peltier element, and the Peltier element and substrate are fixed by, for example, brazing or soldering.

Therefore, it is possible to firmly fix the WDM filter component on the substrate for a longer period of time.

Still furthermore, since an LD element and a WDM filter which reflects pumping light emitted by the abovementioned LD element are fixed on the same base, the unevenness of the deformation amount of each position on the abovementioned substrate can be absorbed between the substrate and the base even in a case where deformation such as warping arises at the substrate. Therefore, the beam axis slip between the LD element and the WDM filter component on the same base can be further reduced than that of the prior arts.

In the integrated module for an optical fiber amplifier according to the invention described in claim 2, the beam splitter component is fixed at the low thermal conductivity portion of the rest by laser beam welding, and is fixed at the substrate via the abovementioned rest by brazing or soldering.

Therefore, it is possible to firmly fix the beam splitter portion on the substrate for a longer period of time.

In the integrated module for optical fiber amplifier according to the invention described in claim 3, the base has a high thermal conductivity portion and a low thermal conductivity portion, the laser diode element is fixed at the abovementioned high thermal conductivity portion of the base, and the WDM filter component or beam splitter component, or both are fixed at the abovementioned low thermal conductivity portion.

Accordingly, as in the invention described in claim 1 or 2, the WDM filter component or beam splitter component can be firmly fixed at the low thermal conductivity portion of the base for a longer period of time, and at the high thermal conductivity portion of the base, it is possible to improve the thermal diffusion performance from the LD element to outside the module.

In the integrated module for an optical fiber amplifier according to the invention described in claim 1, since the part, at which a Peltier element is positioned, of the substrate is made into a high thermal conductivity portion, heat generated at the lower part of the Peltier element can be efficiently diffused outside the module in comparison with the prior arts.

Furthermore, since a high thermal conductivity portion is formed at the base and the WDM filter component is fixed at the low thermal conductivity portion of the base by laser beam welding, the WDM filter component is firmly fixed on the substrate via the abovementioned base for a longer period of time.

Furthermore, since an LD element and a WDM filter for reflecting pumping light emitted from the LD element are fixed on the same base, the beam axis slip at the LD element and WDM filter can be further reduced in comparison with the prior arts even in a case where deformation such as warping is generated at the substrate.

In the integrated module for an optical fiber amplifier according to the invention described in claim 2, the beam splitter component is fixed at the low thermal conductivity portion of the rest by laser beam welding, and is fixed at the substrate via the abovementioned rest by brazing or soldering. Therefore, it is possible to firmly fix the beam splitter component on the substrate via the rest for a longer period of time.

In the integrated module for an optical fiber amplifier according to the invention described in claim 3, since the laser diode element is fixed at the abovementioned high thermal conductivity portion of the base, and a metallic holder on which the WDM filter or the beam splitter is fixed at the low thermal conductivity portion, a firm and long-term fixing between the WDM filter or the beam splitter component and the base or the substrate is not spoiled, and the heat diffusion performance from the LD element to the base and substrate can be further improved.

BRIEF DESCRIPTION OF THE DRAWINGS

FIG. 1(a) and FIG. 1(b) are explanatory views showing one example of the embodiments of an integrated module for an optical fiber amplifier according to the invention, wherein FIG. 4(a) and FIG. 4(b) are explanatory views showing one example of conventional integrated modules for an optical fiber amplifier, wherein

BEST MODE FOR CARRYING OUT THE INVENTION

In order to explain the invention in further detail, a description is given of the invention with reference to the accompanying drawings.

A description of the parts which are similar to those described in FIGS. 4(a) and 4(b) and FIG. 5 is omitted or simplified.

Figure 1:
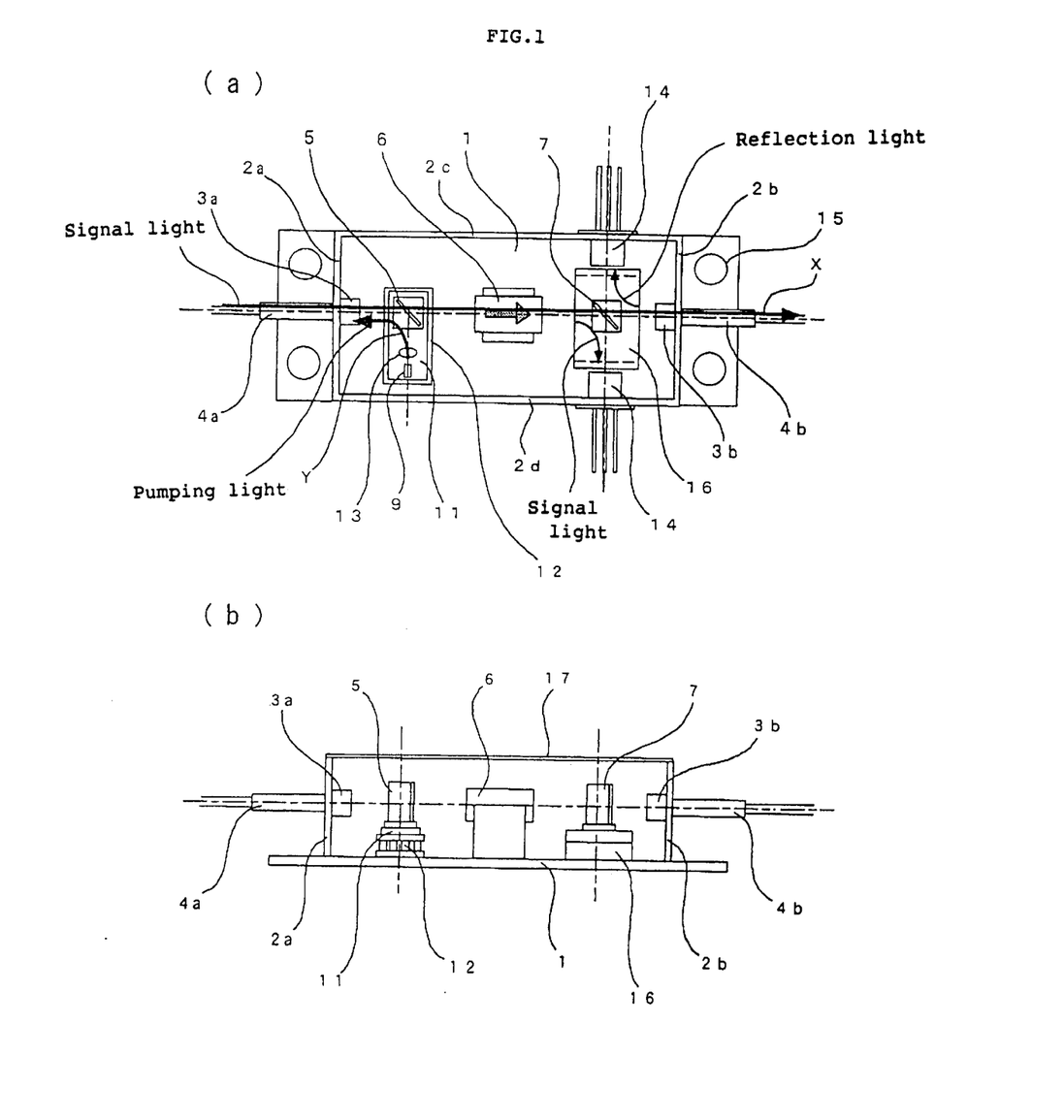
FIG. 1(a) is an upper plan view.
FIG. 1(b) is a side elevational view partially showing the cross section of the example.

FIGS. 1(a), 1(b) show an integrated module for an optical fiber amplifier which will become one example of the embodiments of the invention.

As shown in FIGS. 1(a), 1(b), in the integrated module for optical fiber amplifier, as in prior art, a WDM filter component 5, optical isolator 6, beam splitter component 7, LD element 9 and PD 14 are disposed on the substrate 1 surrounded by erect side face plates 2a through 2d.

However, the entire substrate 1 is made into, for example, a high thermal conductivity portion.

Cu and Cu-W based alloy such as 10 to 20 Cu-W, etc., may be listed as examples of materials used for such a high thermal conductivity portion.

The composition of the respective metals is displayed by percents in weight.

And the WDM filter component 5 is not directly fixed on the substrate 1 but it may be fixed on the same base, 11 at which an LD element 9 is fixed, by laser beam welding or soldering, and it is indirectly fixed on the substrate 1 via the abovementioned base 11 and Peltier element 12 therebelow.

Furthermore, the base 11 is, for example, a low thermal conductivity portion as a whole.

As an example of Fe-based materials used for such low thermal conductivity portions, 29Ni-16Co-Fe, other Fe-Ni-Co based alloy (KOVAR), 52Ni-Fe, other Fe-Ni based alloy, 42Ni-Fe, 50Ni-Fe, other permalloy, 42Ni-6Cr-Fe, 47Ni-6Cr-Fe, other Fe-Ni-Cr based alloy, 18Cr-Fe, 25Cr-Fe, other Fe-Cr based alloy, stainless steel (SUS 302, 303, 304, 316, 317), and other stainless steel may be listed.

If the base 11 is formed to be 2.0 mm thick or less, preferably 1.5 mm thick or less even though the entire base 11 is a low thermal conductivity portion, heat generated at the LD element 9 is efficiently transmitted to the Peltier element 12 via the base 11.

Furthermore, the beam splitter component 7 is fixed at the rest 16 entirely being a low thermal conductivity portion by laser beam welding and is fixed on the substrate 1 via the corresponding rest 16 by, for example, Ag brazing.

Subsequently, the respective optical components are packaged in a nitrogen atmosphere by the substrate 1, side plates 2a through 2d, and upper face plate 17, thereby completing an integrated module for an optical fiber amplifier.

Figure 2:
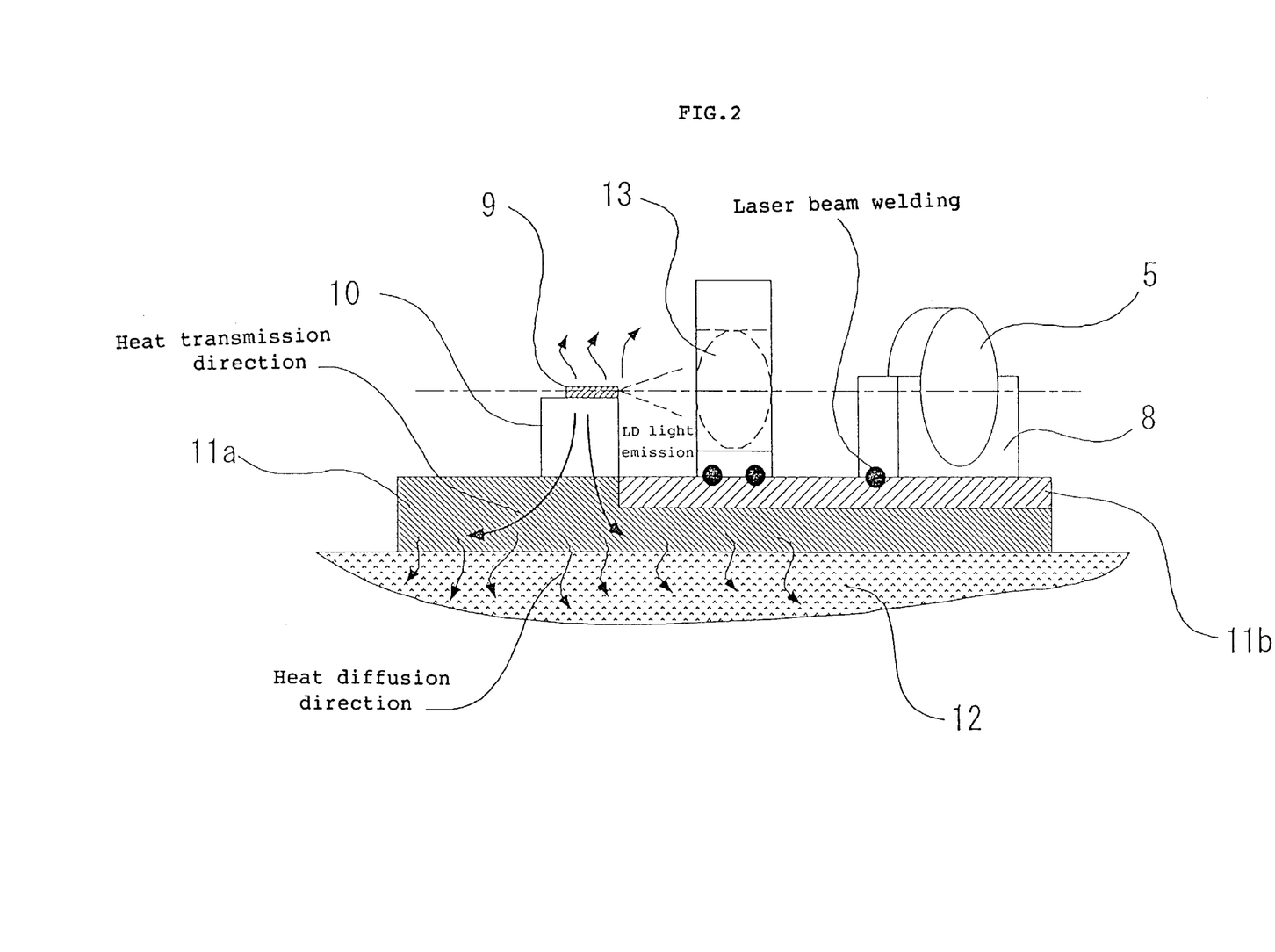
FIG. 2 is a side elevational view showing one example of a base used for the integrated module for an optical fiber amplifier according to the invention.

Furthermore, another example of the base 11 is such that, as shown in FIG. 2, the part where an LD element 9 is mounted is made into a high thermal conductivity portion 11a, and the part where a WDM filter component 5 is mounted is made into a low thermal conductivity portion 11b while both are adhered to each other by brazing or soldering. Still furthermore, the low thermal conductivity portion 11b may be a combination of members made of the abovementioned substances.

By using such a base 11, the heat diffusion performance from the LD element 9 to outside the module can be improved.

Furthermore, in the abovementioned preferred embodiment, an integrated module for an optical fiber amplifier, in which the respective optical components are sealed by a substrate, side plates 2a through 2d and upper face plate 17, is described. However, the side plates 2a to 2d and upper face plate 17 are not requisite in this embodiment.

The substrate 1 of the invention is not limited to that made of Cu or Cu-W based alloy. The substrate 1 may be such that, as shown in FIG. 2, members made of materials of high and low thermal conductivity portions are combined.

The abovementioned preferred embodiment shows an example in which an optical isolator 6 is directly fixed at the substrate 1. In the invention, the corresponding optical isolator 6 and other optical components may be fixed at the base 11 or the rest 16 by laser beam welding, along with a WDM filter component 5 and beam splitter component 7.

It is needless to say that the beam splitter component 7 can be fixed at the same base where both the LD element 9 and WDM filter component 5 are fixed. That is, in this case, the base may be the rest 16.

Still furthermore, the abovementioned preferred embodiment shows an example of a so-called backward pumping type integrated module for an optical fiber amplifier, in which pumping light is sent into an Er doped optical fiber in a reversed direction of a signal light advancing direction. However, the integrated module for an optical fiber amplifier according to the invention may be a so-called forward pumping type, in which pumping light is sent into Er doped optical fiber in the same direction as the signal light advancing direction.

Figure 3:
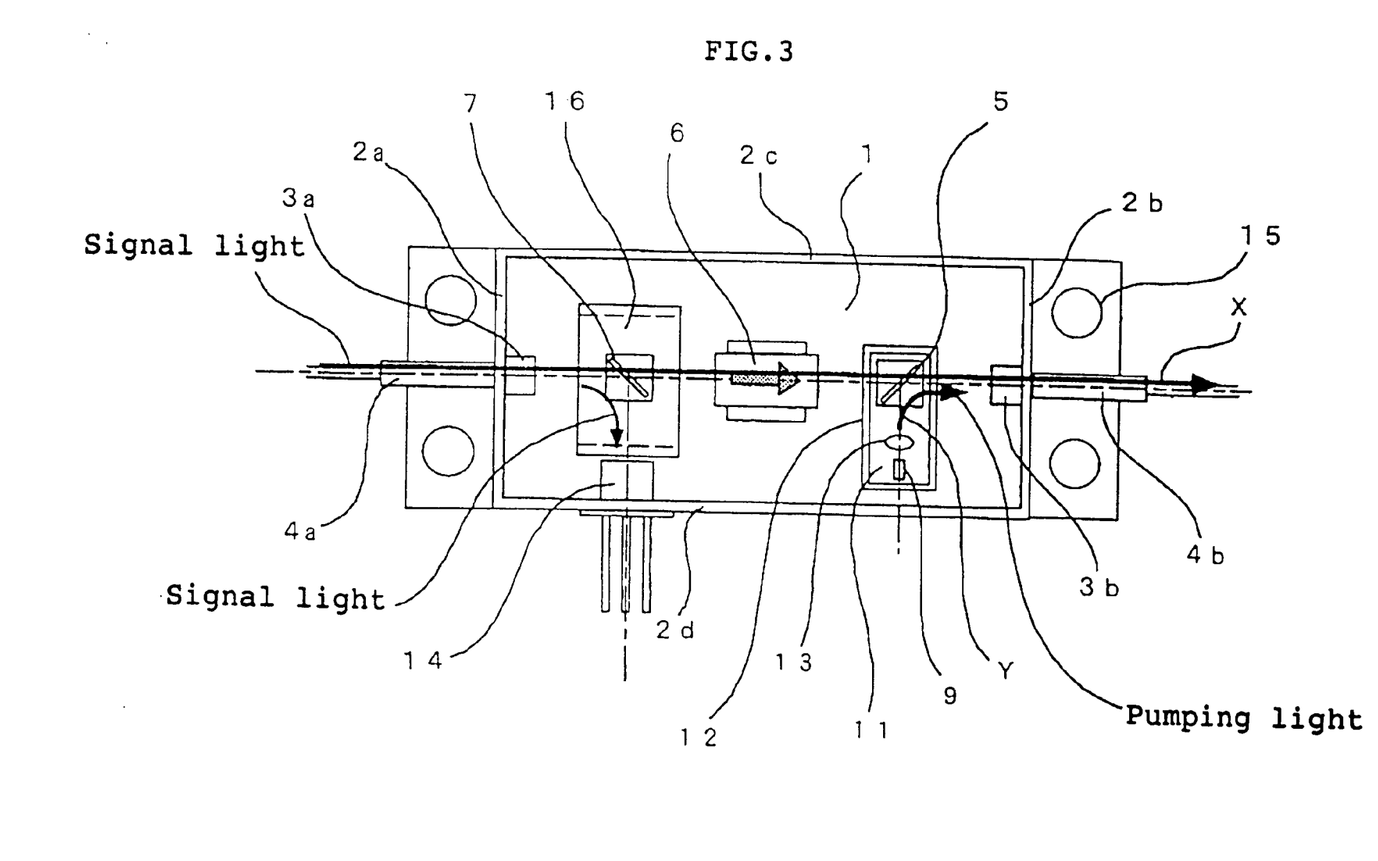
FIG. 3 is an upper plan view showing another example of the embodiments of the integrated module for an optical fiber amplifier according to the invention.

FIG. 3 shows an example of the integrated module for an optical fiber amplifier.

As shown in FIG. 3, though the optical fiber amplifier is provided with a beam splitter component 7 and PD 14 to sample signal light, no PD 14 is provided for sampling reflection light.

In view of the disposed relationship between the LD element 9 and WDM filter component 5, the orientation of reflection of the WDM filter component 5 is made reverse of the case shown in FIG. 1(a) and FIG. 1(b) so that the advancing direction of pumping light is made reversed, and the advancing direction of signal light is made the same as that of pumping light.

In addition thereto, in the abovementioned preferred embodiment, an integrated module for an optical fiber amplifier provided with optical fibers 4a, 4b is described as an example. However, it is not necessary that the optical fibers 4a, 4b and sealing glasses 3a,3b are provided if a signal light input portion, signal light output portion and signal light channel X are formed in the integrated module for optical fiber amplifier.

Industrial Applicability

As described above, an integrated module for an optical fiber amplifier according to the invention is used in an optical fiber amplifier in which an optical fiber to which rare earth elements such as Er, etc., is doped is adopted as an amplification medium, and is suitable for application as an optical module which transmits amplified signal light at the same time while supplying pumping light to the abovementioned rare earth elements doped optical fiber in order to amplify signal light inputted into an optical fiber amplifier.

What is claimed is:

1. An integrated module for an optical fiber amplifier having a signal light input portion, a signal light output portion and a substrate; comprising;

a signal light channel for directing signal light from the signal light input portion to the signal light output portion via the substrate;

a WDM filter component for allowing signal light to pass therethrough and for reflecting pumping light, said WDM filter component being disposed and fixed to at least a portion of the signal light channel on said substrate;

a laser diode element for guiding pumping light to the WDM filter component disposed and fixed via a base and a Peltier element at locations other than the signal light channel on the substrate by brazing or soldering; and wherein a location at which the Peltier element is fixed to a high thermal conductivity portion of the substrate is constructed of Cu or Cu-W based alloy; and at least a portion of said base includes a low thermal conductivity portion constructed of Fe-Ni-Co based alloy, Fe-Ni based alloy, Fe-Ni-Cr based alloy, Fe-Cr based alloy or stainless steel, and said WDM filter component is fixed to the low thermal conductivity portion of the same base, at which said laser diode element is secured, by laser beam welding.

2. An integrated module for optical fiber amplifiers as set forth in claim 1, including a beam splitter component for reflecting a part of signal light or reflection light outside the signal light channel, and for causing rejected light to be received by a photo diode, and for allowing the remaining signal light to pass through, is disposed at a part being a signal light channel on the substrate; and said beam splitter component being fixed at said low thermal conductivity portion of the rest, at which a low thermal conductivity portion is provided, by laser beam welding, and is fixed on the substrate via said rest by brazing or soldering.

3. An integrated module for optical fiber amplifiers as set forth in claim 2, wherein the base has a low thermal conductivity portion and a high thermal conductivity portion, and wherein the laser diode element is fixed at said high thermal conductivity portion of the base, one of the WDM filter component and the beam splitter component or both is (are) fixed at said low thermal conductivity portion of the base.

4. An integrated module for optical fiber amplifiers as set forth in claim 1, wherein the base has a low thermal conductivity portion and a high thermal conductivity portion, and wherein the laser diode element is fixed at said high thermal conductivity portion of the base, one of a WDM filter component and a beam splitter component or both is (are) fixed at said low thermal conductivity portion of the base.

* * * * *

UNITED STATES PATENT AND TRADEMARK OFFICE
CERTIFICATE OF CORRECTION

Page 1 of 1

PATENT NO. : 6,053,640
DATED : April 25, 2000
INVENTOR(S) : Miyokawa et al

It is certified that error appears in the above-identified patent and that said Letters Patent is hereby corrected as shown below:

Title Page:
Under reference [30]: the Japanese filing date should read -- February 12, 1997--.
Under reference [86] PCT No: "PCT/EP98/00530" should read – PCT/JP98/00530--

Column 9,
Line 6, "rejected" should read – reflected –
Line 16, "2" should read – 1 –

Column 10,
Line 4, "the" should read – a –
Line 8, "1" should read – 2 --
Line 11, "a" should read – the –
Line 12, "a' should read –the--

Signed and Sealed this

Seventeenth Day of July, 2001

Attest:

NICHOLAS P. GODICI
Attesting Officer    Acting Director of the United States Patent and Trademark Office